United States Patent [19]

Ida et al.

[11] 4,392,751
[45] Jul. 12, 1983

[54] DAMPED BEARING DEVICE

[75] Inventors: Michiaki Ida, Chiyodamura; Noriaki Hagiwara, Amimachi; Naoyoshi Yamago, Tamarimura; Masahiro Yoshioka, Sakuramura; Katsuaki Kikuchi, Tsuchiura, all of Japan

[73] Assignee: Hitachi, Ltd., Tokyo, Japan

[21] Appl. No.: 270,658

[22] Filed: Jun. 4, 1981

[30] Foreign Application Priority Data

Jun. 4, 1980 [JP] Japan .................................. 55/74264

[51] Int. Cl.³ ........................ F16C 27/02; F16C 32/06
[52] U.S. Cl. ...................................... 384/99; 384/247
[58] Field of Search ................ 308/9, 26, 61, 59, 122, 308/240; 384/99, 125, 118, 252, 119, 215, 247, 260, 271

[56] References Cited

U.S. PATENT DOCUMENTS

| | | | |
|---|---|---|---|
| 3,301,613 | 1/1967 | DeClaire | 308/26 |
| 3,456,992 | 7/1969 | Kulina | 308/9 |
| 4,025,130 | 5/1977 | Streifert | 308/9 |
| 4,027,931 | 6/1977 | Streifert | 308/15 |
| 4,097,094 | 6/1978 | Gardner | 308/9 |
| 4,119,375 | 10/1978 | Kirk et al. | 308/9 |
| 4,366,994 | 1/1983 | Yoshioka | 308/26 |

*Primary Examiner*—Stuart S. Levy
*Assistant Examiner*—David Werner
*Attorney, Agent, or Firm*—Antonelli, Terry & Wands

[57] ABSTRACT

A damped bearing for damping the vibration generated in a bearing supporting a rotary shaft and shaft system, by a fluid film damper and by a resilient bearing support. The damped bearing is characterized by having a means in the fluid film damper for adjusting the damping coefficient of the fluid film damper.

3 Claims, 10 Drawing Figures

DAMPED BEARING DEVICE

BACKGROUND OF THE INVENTION

The present invention relates to a damped bearing device suitable for use in high-speed rotary machines and, more particularly, to a damped bearing device for use in high-speed rotary machines which undergo several critical speeds in the course of acceleration to the high running speed.

Damped bearing devices constructed to damp the vibration generated in the rotary shaft of the rotary machine are disclosed, for example, in the specifications of U.S. Pat. Nos. 3,456,992 and 4,027,931. These damped bearing devices are constituted by a fluid film damper formed between a bearing which supports a rotary shaft and a housing, and a bearing support spring means by which the bearing is supported on the housing. The vibration in the bearing and the unstable vibration referred to as "oil whip" due to unstable oil film are damped by a combined effect of the resilient force exerted by the bearing support spring means and the squeeze action of fluid film in the fluid film damper.

In the damped bearing device of the type described above, there are an optimum damping coefficient of the fluid film damper and an optimum spring stiffness of the bearing support spring means. The optimum damping coefficient and the optimum spring stiffness are determined in accordance with the characteristics of the rotary member and the bearing.

Hitherto, the design and fabrication of the damped bearing devices have been made on the basis of the optimum damping coefficient and the spring stiffness which are determined by calculation taking into account the vibration characteristic.

It is, however, almost impossible to actually realize the expected optimum spring stiffness and optimum damping coefficient, due to various reasons such as insufficient accuracy of calculation or errors in the fabrication of parts and assembling. Particularly, it is extremely difficult to set the thickness of fluid film in the fluid film damper, so that the expected vibration damping effect can hardly be achieved.

SUMMARY OF THE INVENTION

Accordingly, an object of the present invention is to provide a damped bearing device in which means are provided for adjusting the damping coefficient of the fluid film damper, thereby to make it possible to optimize the damping coefficient.

To this end, according to the invention, there is provided a damped bearing device having a bearing which supports a rotary shaft, bearing support spring means through which the bearing is supported resiliently on a housing, and a fluid film damper formed on the outer periphery of the bearing, so that the vibration of the rotary shaft and the shaft system is damped by the combined effects of the resilient force exerted by the bearing support spring means and the squeeze action of the fluid film in the fluid film damper, characterized by comprising means in the fluid film damper for adjusting the damping coefficient of the fluid film damper.

BRIEF DESCRIPTION OF THE DRAWINGS

The above and other objects, as well as advantageous features of the invention will become clear from the following description of the preferred embodiments of the invention taken in conjunction with the accompanying drawings.

DESCRIPTION OF THE PREFERRED EMBODIMENTS

Figure 1:
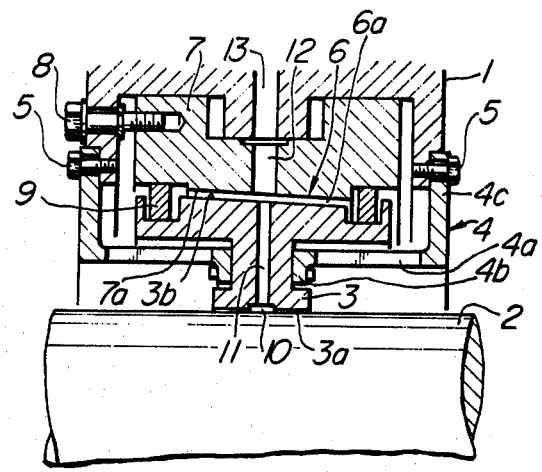
FIG. 1 is a vertical sectional view of a damped bearing device constructed in accordance with an embodiment of the invention.

The invention will be described in detail hereinunder with reference to the accompanying drawings showing preferred embodiments of the invention. Referring first to FIG. 1 showing a first embodiment of the invention, a damped bearing device of the invention has a housing 1, a rotary shaft 2 and a bearing 3 supporting the rotary shaft 2. The bearing 3 is resiliently supported on the housing 1 by means of a resilient bearing support 4. The resilient bearing support 4 has a cage-type construction with a plurality of ribs 4a and is provided with two flanges 4b, 4c, one 4b of which is fixed to the side surface of the bearing 3 while the other flange 4c is secured by bolts 5 to the housing 1. This arrangement permits the bearing 3 to be moved in the radial direction. The bearing 3 is provided on its inner peripheral surface with a slide bearing surface 3a and, on its outer periphery, with a tapered surface 3b. A fluid film gap 6a in a fluid film damper generally designated at a numeral 6 is formed on the tapered surface 3b. A bearing back-up member 7 is placed between the outer peripheral surface of the bearing 3 and the housing 1. The bearing back-up member 7 is provided on its inner periphery with a tapered surface 7a extending in parallel with the tapered surface 3b of the bearing 3. The bearing back-up member 7 is able to slide in the axial direction along the inner surface of the housing 1, by turning of adjusting screws 8. In order to prevent leaking, viscous seals 9 are provided on the outer peripheral surface of the bearing 3 at portions near both axial ends of the latter. The slide bearing surface 3a of the bearing 3 has a fluid supply groove 10 which leads to a fluid supply passage 13 formed in the housing 1 through both a fluid passage 11 formed in the bearing 3 and a passage 12 formed in the bearing back-up member 7, via the fluid damper 6.

The damped bearing device of this embodiment with a construction described above, is operated in a manner explained as follows.

As stated before, the outer peripheral surface of the bearing 3 and the inner peripheral surface of the bearing back-up member 7 are tapered in such a manner as to face to each other and change the position in parallel. Therefore, as the bearing back-up member 7 is moved to the right as viewed in Figures by means of the adjusting screws 8, the fluid film gap 6a of the fluid film damper 6 is increased. On the contrary, the fluid film gap 6a is decreased as the bearing back-up member 7 is moved to the left as viewed in the Figures. By varying the fluid film gap 6a of the fluid film damper 6, it is possible to change the damping coefficient of the fluid film damper 6, as will be understood from the following description.

Namely, the damping coefficient C of the fluid film damper 6 is given as the following equation (1), in relation to the shape and size of the fluid film gap 6a:

$$C = (\pi \mu /2)(R/Cr)^3 (L^3/R^2) \ldots \quad (1)$$

where,
$\mu$: coefficient of viscosity of fluid
R: radius of fluid film gap 6a
L: axial length of fluid film gap 6a
Cr: thickness of fluid film gap 6a From the equation (1) above, it will be seen that the damping coefficient C can be increased in inverse proportion to the cube of the thickness Cr of the fluid film gap 6a by changing the thickness Cr thereof.

Figure 2:
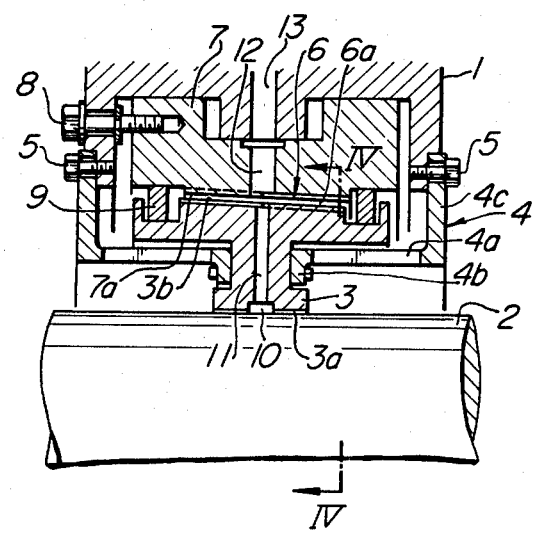
FIG. 2 is a vertical sectional view of a damped bearing device constructed in accordance with another embodiment of the invention.
Figure 3:
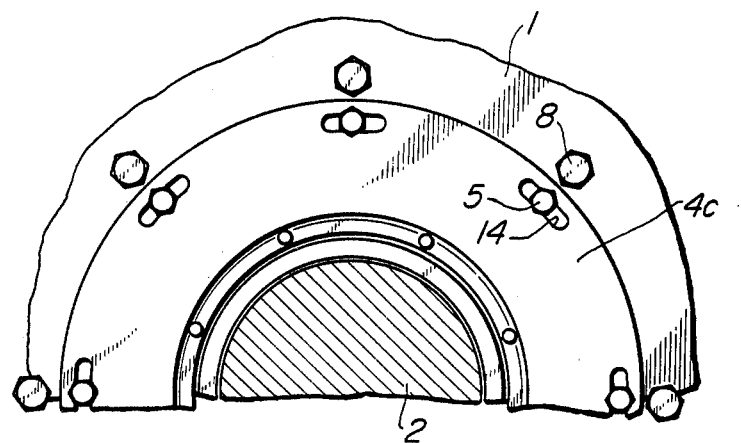
FIG. 3 is a left-side elevational view of the damped bearing device shown in FIG. 2.
Figure 4:
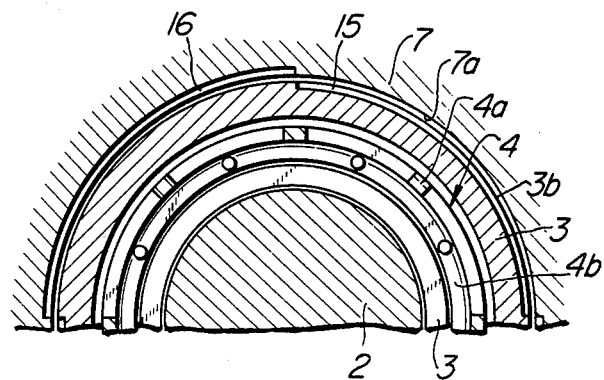
FIG. 4 is an illustration of the damped bearing device as viewed in the direction of arrows IV—IV of FIG. 2.
Figure 5:
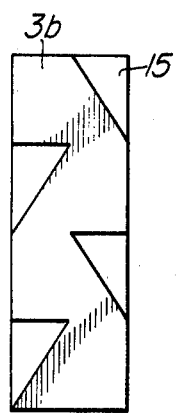
FIG. 5 is a developed view of the outer peripheral surface of the bearing in a fluid film damper of the damped bearing device as shown in FIG. 2.
Figure 6:
FIG. 6 is a right-side elevational view of the outer peripheral surface shown in FIG. 5.
Figure 7:
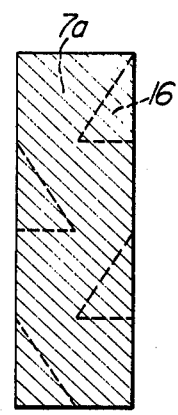
FIG. 7 is a developed view of the inner peripheral surface of a bearing back-up member in the fluid film damper of the damped bearing device shown in FIG. 2.
Figure 8:
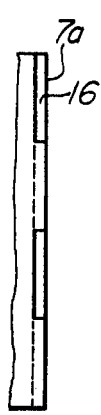
FIG. 8 is a right-side elevational view of the inner peripheral surface shown in FIG. 7.

FIG. 2 shows a second embodiment of the invention, in which the same reference numerals are used to denote the same parts or members as those of the first embodiment shown in FIG. 1. In the damped bearing device of the second embodiment, the damping coefficient is adapted to be adjusted by varying the area of action of the fluid film damper 6. To this end, the flange 4c of the resilient bearing support 4 is provided with elongated holes 14 for receiving bolts, as shown in FIG. 3. The arrangement is such that, after loosening the bolts 5, the bearing 3 can be turned in the circumferential direction through the medium of the resilient bearing support 4. As will be understood from FIGS. 4 to 6, recesses 15 are formed in the tapered surface 3b of the bearing 3. Similarly, as shown in FIGS. 7 and 8, the tapered surface 7a of the bearing back-up member 7 opposing to the tapered surface 3b is provided with recesses 16.

Figure 9:
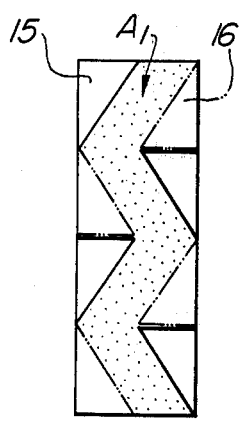
FIGS. 9 and 10 are illustrations of states of changing of the area of action of the fluid film in the fluid film damper shown in FIG. 2.
Figure 10:
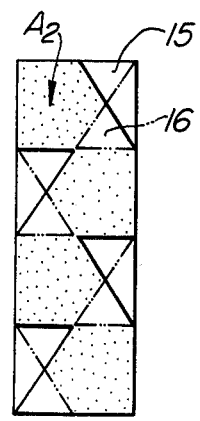

In consequence, as a torque is imparted through the resilient bearing support 4 to the bearing 3 to turn the latter, the area of action of the fluid film is varied as represented by $A_1$ and $A_2$ in FIGS. 9 and 10. By changing the area of action of the fluid film in the manner stated above, the values of R and L in the equation (1) above are changed to vary the damping coefficient C.

In the damped bearing device of the second embodiment shown in FIG. 2, the damping coefficient is varied by means of either one or both of the adjustment of the area of action of the fluid film achieved by the turning of the bearing 3 and the adjustment of the fluid film gap 6a of the fluid film damper effected by the axial movement of the bearing back-up member 7. In the second embodiment, however, the adjustment of the fluid film gap 6a may be omitted. In such a case, the damping coefficient can be varied solely by the adjustment of the area of action of the fluid film.

According to the invention, it is possible to adjust the damping coefficient to the optimum value for the change of fluid viscosity in the ambient air temperature. This gives an advantage of the unnecessity for the troublesome precise control of the fluid temperature.

Although the damped bearing devices of the described embodiments incorporate plain bearings as the bearing 3, it is possible to substitute other types of bearing for the plain bearing.

As has been described, according to the invention, there is provided a damped bearing device which permits adjustments of the fluid film gap in the fluid film damper and/or of the area of action of the fluid film, after the assembling of the device, to make it possible to optimize the damping coefficient of the damped bearing device to ensure a higher effect of damping of the vibration generated in the bearing and the shaft system.

What is claimed is:

1. In a damped bearing device having a housing, a bearing which supports a rotary shaft, a resilient bearing support by which said bearing is supported on said housing, and a fluid film damper formed between said housing and the outer peripheral surface of said bearing, so that the vibration generated in the bearing and the shaft system is damped by said fluid film damper and by said resilient bearing support, the improvement comprising means provided in said fluid film damper and adapted for adjusting the damping coefficient thereof, wherein said means for adjusting the damping coefficient of said fluid film damper is adapted for variably adjusting the fluid film gap in said fluid film damper, and wherein said means for adjusting the damping coefficient of said fluid film damper includes a bearing having a tapered outer peripheral surface on which said fluid film acts, and a bearing back-up member axially movable along said housing and having a tapered surface opposing to said tapered outer peripheral surface of said bearing with said fluid film gap formed therebetween.

2. In a damped bearing device having a housing, a bearing which supports a rotary shaft, a resilient bearing support by which said bearing is supported on said housing, and a fluid film damper formed between said housing and the outer peripheral surface of said bearing, so that the vibration generated in the bearing and the shaft system is damped by said fluid film damper and by said resilient bearing support, the improvement comprising means provided in said fluid film damper and adapted for adjusting the damping coefficient thereof, wherein said means for adjusting the damping coefficient of said fluid film damper is adapted for variably adjusting the area of action of the fluid film of said fluid film damper, and wherein said means for adjusting the damping coefficient of said fluid film damper includes a bearing having an outer peripheral surface on which the fluid film acts, said outer peripheral surface being provided with recesses, and a bearing back-up member provided with recesses in its inner peripheral surface opposing to said outer peripheral surface of said bearing, said bearing back-up member being rotatable provided in said housing.

3. In a damped bearing device having a housing, a bearing which supports a rotary shaft, a resilient bearing support by which said bearing is supported on said housing, and a fluid film damper formed between said housing and the outer peripheral surface of said bearing, so that the vibration generated in the bearing and the shaft system is damped by said fluid film damper and by said resilient bearing support, the improvement comprising means provided in said fluid film damper and adapted for adjusting the damping coefficient thereof, wherein said means for adjusting the damping coefficient of said fluid damper is adapted for variably adjusting both the fluid film gap in said fluid film damper and the area of action of the fluid film of said fluid film damper, and wherein said means for adjusting the damping coefficient of said fluid film damper includes a bearing having a tapered outer peripheral surface on which the fluid film acts, said tapered outer peripheral surface having recesses formed therein; and a bearing back-up member having a tapered inner peripheral surface opposing to said tapered outer surface of said bearing, said tapered inner peripheral surface having recesses formed therein, said bearing back-up member being supported in said housing in such a manner as to be able to move in the axial direction and to turn in the circumferential direction.

* * * * *